(12) United States Patent
Koslow

(10) Patent No.: US 7,950,525 B2
(45) Date of Patent: May 31, 2011

(54) PROCESS AND DEVICE FOR SEPARATING PLASTICS OF DIFFERENT CHEMICAL COMPOSITION BY FLOTATION

(76) Inventor: Alexander Koslow, Landshut (DE)

( * ) Notice: Subject to any disclaimer, the term of this patent is extended or adjusted under 35 U.S.C. 154(b) by 757 days.

(21) Appl. No.: 11/935,861

(22) Filed: Nov. 6, 2007

(65) Prior Publication Data

US 2008/0110806 A1    May 15, 2008

Related U.S. Application Data

(63) Continuation of application No. PCT/DE2006/000603, filed on Apr. 5, 2006.

(30) Foreign Application Priority Data

May 6, 2005   (DE) .......................... 10 2005 021 091

(51) Int. Cl.
   *B03D 1/14* (2006.01)

(52) U.S. Cl. ..................... 209/169; 209/162; 209/168

(58) Field of Classification Search ............ 209/162, 209/168–170, 425, 426, 486, 490–496
   See application file for complete search history.

(56) References Cited

U.S. PATENT DOCUMENTS

| | | | | |
|---|---|---|---|---|
| 1,455,854 A | * | 5/1923 | Anderson et al. | 209/493 |
| 2,426,337 A | * | 8/1947 | Bird | 209/424 |
| 4,119,533 A | * | 10/1978 | Saitoh et al. | 209/155 |
| 4,190,522 A | * | 2/1980 | Tra | 209/170 |
| 4,265,744 A | * | 5/1981 | Weiffen | 209/457 |
| 5,248,041 A | | 9/1993 | Deiringer et al. | 209/166 |
| 5,357,688 A | * | 10/1994 | Christensen | 34/369 |
| 5,566,832 A | | 10/1996 | Stückrad et al. | 209/9 |
| 5,653,867 A | | 8/1997 | Jody et al. | 209/164 |
| 5,840,156 A | * | 11/1998 | Hebert et al. | 162/4 |
| 6,227,374 B1 | * | 5/2001 | Britz et al. | 209/164 |
| 7,255,233 B2 | * | 8/2007 | Daniels et al. | 209/162 |
| 2004/0099576 A1 | | 5/2004 | Rem et al. | 209/170 |

FOREIGN PATENT DOCUMENTS

| | | |
|---|---|---|
| AT | 411 155 B | 10/2003 |
| DE | 42 17 464 A1 | 12/1993 |
| DE | 42 24 948 A1 | 2/1994 |
| DE | 197 33 059 A1 | 2/1999 |
| GB | 456249 | 11/1936 |
| GB | 1063265 | 3/1967 |
| JP | 32003799 A | 8/1953 |
| JP | 10086153 A | 4/1998 |
| JP | 11138043 A | 5/1999 |
| JP | 2000317340 A | 11/2000 |
| JP | 20055169255 A | 6/2005 |

OTHER PUBLICATIONS

International Search Report, Jul. 25, 2006, 3 pages, PCT/DEA2006/000603.

* cited by examiner

*Primary Examiner* — Joseph C Rodriguez

(74) *Attorney, Agent, or Firm* — St. Onge Steward Johnston & Reens LLC

(57) ABSTRACT

A method and a device for separating plastic materials in accordance with their chemical composition, which is based on the difference in density of such materials. For this purpose, a flotation process which works with a flotation liquid that is put into vibration is used, the frequency of which is controlled in accordance with the density of the particles to settle. Heavier plastic particles settle on a perforated plate bottom and are removed to a collecting container filled with the same liquid to the same level as the flotation tank. Lighter plastic particles float to the surface and are fed into a follow-up flotation tank for further separation.

10 Claims, 3 Drawing Sheets

PROCESS AND DEVICE FOR SEPARATING PLASTICS OF DIFFERENT CHEMICAL COMPOSITION BY FLOTATION

CROSS-REFERENCE TO RELATED APPLICATIONS

The present application is a continuation of pending International patent application PCT/DE2006/000603 filed on Apr. 5, 2006 which designates the United States and claims priority from German patent application 10 2005 021 091.0 filed on May 6, 2005, the content of which is incorporated herein by reference.

FIELD OF THE INVENTION

The invention relates to systems and methods for separating mixtures of different materials, and more specifically to a method for separating plastic materials of different chemical composition by a flotation process and a separation device for carrying out the method.

BACKGROUND OF THE INVENTION

Nowadays processes and devices are known to separate mixtures of different materials originating from shredder fractions and to treat them for re-usage possibility. For doing so ferrous-magnetic metal particles are separated from non-magnetic particles, plastics from nonferrous heavy metal on the one-hand side, and on the other hand, inflammable material from flammable materials. There are problems with such a separation for plastic materials, since today law requests an exact separation of such materials, in order to recycle each individual plastic component in a material specific way. Sifters, operating in accordance with material density ratio, and which are used in generally well-known processes for separating plastics, use air as flotation fluid. The results achieved by this type of sifters are unsatisfactory. At the end of such processes a mixture of different plastic components is received that is still not pure with regard to individual plastic components. One reason is essential for such unsatisfactory results. That is, density of different kind of plastics varies so little from one another that such a procedure must lead to unsatisfactory results. Settling of plastic material in an air stream results in no clear separation of different kind of plastic materials. Such processes result in a conglomerate of different types of plastics that settle on the bottom of a flotation tank.

There are known further processes and devices to separate different kinds of material, e.g. light and heavier fibers, colors and so on, for which liquid is used as flotation medium and in which lighter particles of the material to be separated were kept in a floating zone in poise by aerating the flotation medium. Such lighter material is transported to the surface of the flotation medium and can there be skimmed. Heavier particles of the material to be separated sink, due to gravity, to the bottom of the flotation tank and are skimmed in the bottom area (see AT 411,155 B and DE 197 33 059 C2). These processes and devices are not suitable for separation of plastics, since plastic materials easily re-float to the surface due to their only slight differences in density and relatively big surfaces of individual particles. Hence, it is essential that re-floating of already settled particles be prevented. An embodiment similar to this invention is not deducible from that state of the art and is perhaps even not wanted for the materials to be separated by the state of the art. Lost separating liquid will be added.

A precise separation of plastic materials in correspondence with their individual chemical composition is not or hardly possible with the aforementioned processes and devices. Hence, it is excluded to re-use plastics that are obtained by one of these processes or devices, in correspondence to their inherent characteristic features.

According to the state of the art they will enter into thermal utilization since such utilization does not require a clear separation of plastics with regard to their chemical composition.

It is one task of this invention to create a process and a device that leads to a clear separation of plastic materials in accordance with their chemical composition.

SUMMARY OF THE INVENTION

Following this invention, plastic materials will be converted into a homogeneous conglomerate, preferably composed of particles that are of about the same size.

This conglomerate is given into a liquid, preferably water, which is filled into a flotation tank. Consequently to the principle of flotation processes, separation of the different kind of plastic materials occurs because different plastics vary from one another by their specific gravity (unit of volume weight, relative density). The flotation tank comprises at least one perforated plate as intermediate bottom that is arranged at a specific level, on which heavier plastic particles settle and separate from lighter ones. In that area the flotation tank is equipped with a delivery-device for discharging of settled materials. Discharging must be organized in a way that avoids any motion entering into the settled material. Every unnecessary motion may induce re-floating of settled material.

The delivery-device, that is located in a separate housing which is attached to the flotation tank, comprises a revolving cylinder with sealing lips on its surface that glide along a specific section of the housing and remove already settled material from the sediment layer in the flotation tank, the latter being connected with the internal of the housing of the discharging-device with at least one opening. Discharging ensues into a discharge-container that is filled with the same liquid as the flotation tank. The level of liquid in the discharge-container is equal to that in the flotation tank, thus following the principle of communicating tubes.

From the discharge-container either a belt type elevator or conveyer chain, being equipped with ladles or buckles, transport settled material into a container for checking quality of the settled stuff. For target-oriented support of separation of plastic materials due to their chemical composition, a pulsation device is located underneath of the perforated plate, which forms an intermediate bottom. This pulsation device may comprise a housing similar to the shape of a bell open towards the lower wall (bottom) of the flotation tank, or be closed by a diaphragm. This pulsation device effects by pulsating air, that the liquid in the flotation tank be put in vibration, forcing plastic particles, due to their density, either to swim to the surface of the flotation liquid (lighter plastic particles) or heavier plastic particles to sink down and to settle on the perforated plate (intermediate grid-bottom) in the flotation tank. Different means for producing vibration (pulsating motion) in the flotation liquid may be used, e.g. hydraulic, mechanical or electrical vibrators. A variety of vibration producers or a plurality of the same type of vibration producers may be used together to increase or accelerate separation of plastic materials of different chemical composition.

Inclination of the perforated plate-bottom towards the discharge device may be altered. Due to the position of the inclination of the perforated plate bottom and due to the position of the swiveling flaps pivoted to the perforated plate bottom (grid-bottom), thickness of the sediment layer on the grid-bottom can be controlled in such a way that it is almost equal over the whole area of the grid-bottom. Flotation liquid is lost by discharging of plastic material from the sediment layer and will be replaced through a particular controlled liquid feeding device (e.g. tube) connected to the bottom area of the flotation tank. Heavy motions of the flotation liquid have to be avoided, in order not to disturb settling of heavy plastic material particles.

In order to separate a plurality of different plastic fractions of varying density a number of flotation devices, the number being equivalent to the number of plastics to be separated, may be placed one behind the other in a row, e.g. in the way of a cascade. A flotation tank for lighter plastic material will always follow the flotation tank for heavier plastic material. It is essential that the frequency of vibration of the flotation liquid is adapted to the needs of the material to be separated. This means that separation of plastics of varying density occurs due to a difference in their lowering speed.

Vibration initiated by pulsating air that is induced by either a piston or diaphragm pump at the bottom area of the flotation tank effects a homogenization of the separation process of the various plastic components. It is essential that vibration frequency in the liquid bath induced by air is adapted to the individual needs of the plastics to be separated.

It is also essential that the thickness of the sediment layer of plastic particles on the grid-bottom of the flotation tank is equal over the whole area. That is controlled and governed by sensors that measure thickness and density of the sediment. These sensors are equally distributed across the whole area of the grid bottom. These sensors co-operate with a control device, which also adapts the inclination of the grid-bottom and the position of the swiveling pivoted flaps, in conformity with the information provided by the sensors thus governing the settling of plastic particles for equal distribution across the area of grid-bottom.

In order to ensure that only well separated plastic material is returned for re-usage, the whole material separated in the flotation tank is discharged into a checking container, from which samples are taken and checked for homogeneity, e.g. pureness of the composition of the sediment. This checking may be conducted either by infrared-light, x-raying, and laser beams or ultrasound equipment. Those charges, which do not meet the requirements of the check, are returned into the separating process as often as necessary to have them finally meet the requirement of purity.

The device that was developed for the execution of this separation process, at least comprises one flotation tank filled with a liquid, preferably water. Material to be separated is introduced into the flotation tank through a loading pipe. Due to its particular density, the material to be separated sinks in the flotation tank and settles on the grid-bottom. Sensors equally arranged and distributed across the whole area of the grid-bottom above the sediment layer guarantee a homogeneous spreading of the sediment. They measure the thickness of the sediment layer at specific points and adapt through a control device the inclination of the grid-bottom and adjust the position of swiveling flaps. Sinking plastic particles are always directed to spots at which the thickness of the sediment layer of settled plastic particles is too small. Combined with this operation may be an adaptation of the frequency of the pulsation of the air-column and related to that a change of the frequency of vibration caused in the flotation liquid for supporting equal thickness of the sediment layer.

Another object of this invention is to manually or automatically adapt distance between the lower edge of the bell shaped pulsation device and the bottom of the flotation tank to the needs of the separation process. By such a measure the vibration energy transmitted to flotation liquid may be lowered or increased. A modification of the frequency of the air pump, respectively its revolution, vibration of the flotation liquid can be controlled.

A further object of this invention is that the revolution of one or more rotating drums of the discharge device may be modified automatically or manually in order to adapt the discharging speed of the sediment to the speed of settling. The housing of the revolving drums maybe mounted to one longitudinal wall of the flotation tank in a horizontal or vertical way and overlap the whole of this longitudinal wall of the flotation tank. Lips of elastic material may be mounted to the surface of the drum, in longitudinal direction, of the discharging device in such a way that the arc of the angle between the lips is about 180°, 90° or 60°. Such a construction may support discharging of the sediment into a discharge container. It is recommendable to keep the arc of the angles between the lips equal.

It is of an advantage for an efficient separation of the plastic particles if the size of these particles is about the same and does not differ too much from one another.

DETAILED DESCRIPTION OF THE INVENTION

Figure 1:
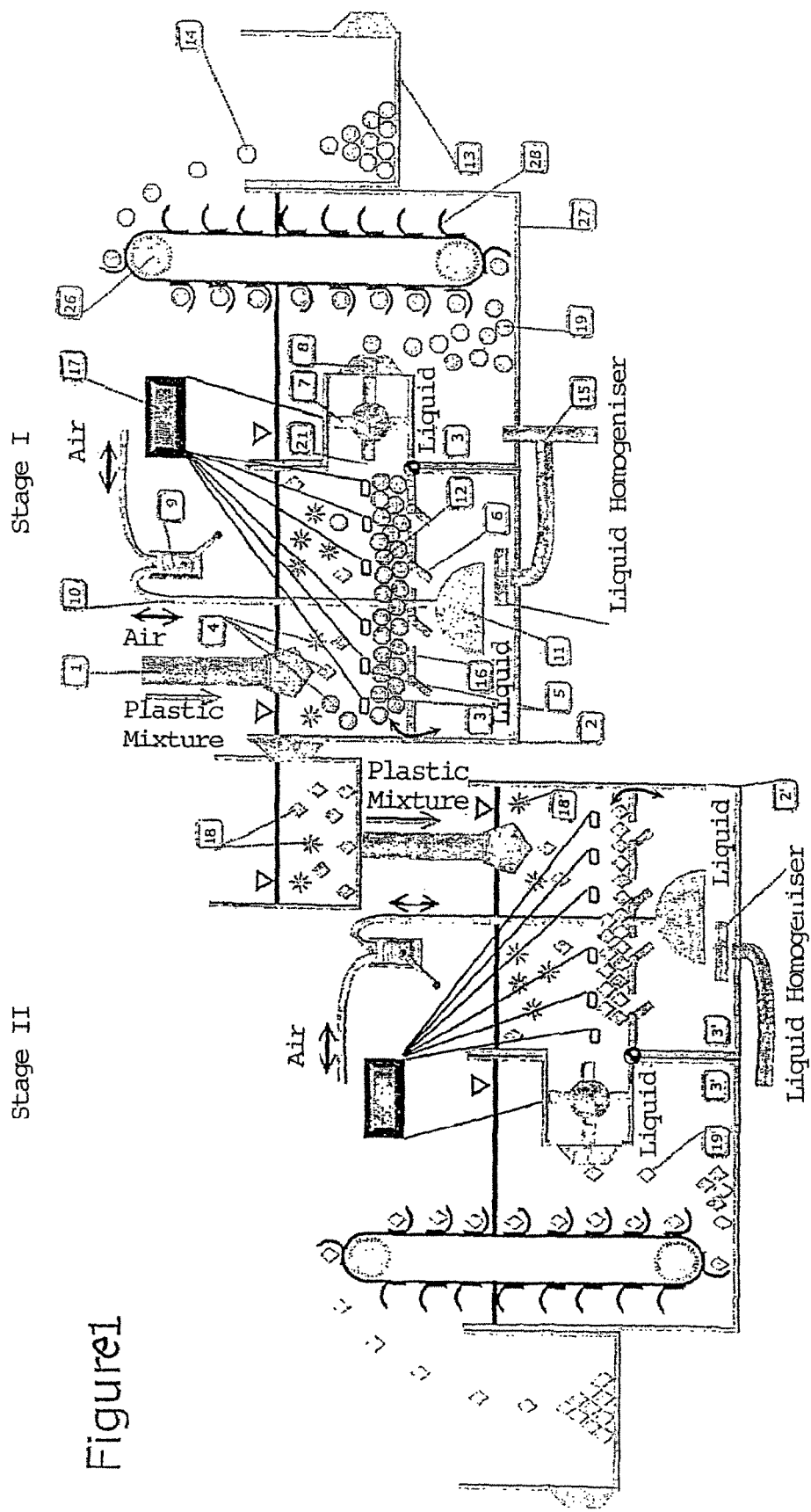
FIG. 1 is a device for separating plastic materials according to an exemplary embodiment of the present invention.

This invention comprises a flotation tank (2), a pulsation device (9,10,11), a perforated plate as intermediate bottom (grid-bottom) (16) which inclination can be tilted in the direction towards a discharging device (or delivery device) (8), a plurality of swiveling flaps (6) both of which are controlled by a control device (17) that receives its commands through sensors (5) which are mounted above a sediment layer (12) in the flotation tank (2). The flotation tank (2), which is filled with flotation liquid (3), is loaded via a charging tube (1) with fractions of material (particles) (4) of a diversity of plastics to be separated. Plastic particles (4) sink in relation to their density quicker or slower down to the grid-bottom (16) of the flotation tank (2).

A pulsating air-column caused by a piston or diaphragm pump acts on the flotation liquid (3) through a bell shaped device (11) that may be open or closed by a movable wall and brings flotation liquid into a pulsating motion, the frequency of which can be controlled. This operation facilitates separation of lighter (18) and heavier (19) fractions. Lighter fractions float to the surface of the flotation liquid (3) bath and can be transported to a follow-up flotation tank (2'). Heavier fractions settle on a grid-bottom (16) and form a sediment layer (12) and are transported to a follow-up collection container (27) by a discharging device (8) that is filled with the same liquid to the same level as the flotation tank (2). From there they are transported by a belt or chain conveyer (26), which are equipped with ladles or buckles (28), the walls of those are perforated to enable dewatering, to a containment (13) for checking, which may also be equipped with a perforated bottom for dewatering purposes. From there samples are taken for checking on purity. Using infrared-light, x-raying, ultrasonic waves or laser beams may perform checking on purity (14). All material that does not meet the requirements of such checks is returned into the flotation tank (2) for further treatment. Material that complies with the requirements of purity will be returned to further material specific re-usage. Hence, separation process can be conducted in a plurality of steps always in order to achieve a demanded purity of the separated sediment (12) of plastic particles.

It is important that thickness (D) of the sediment layer across the whole grid-bottom area of the flotation tank (2) is about equal. In order to achieve such requirement sensors (5) are located above the sediment layer (12) and scan the surface of the layer. Irregularities are reported to a control device (17) that operates by an actuator on flaps (6) that are pivoted to the grid-bottom in a way that irregularities on the sediment layer surface are balanced out by newly settling plastic particles. An additional discharge valve, which enables discharging of lighter plastic-fractions, may be provided. Through a charging Tube (15) lost flotation liquid is returned in a manner, which avoids influencing flotation liquid already in the flotation tank. Refilling is controlled by an automatically or by manually controlled valve. Means are provided which guarantee an entering of liquid, particularly at the entrance of the refilling tube (15), which prevent any turbulence.

Figure 2:
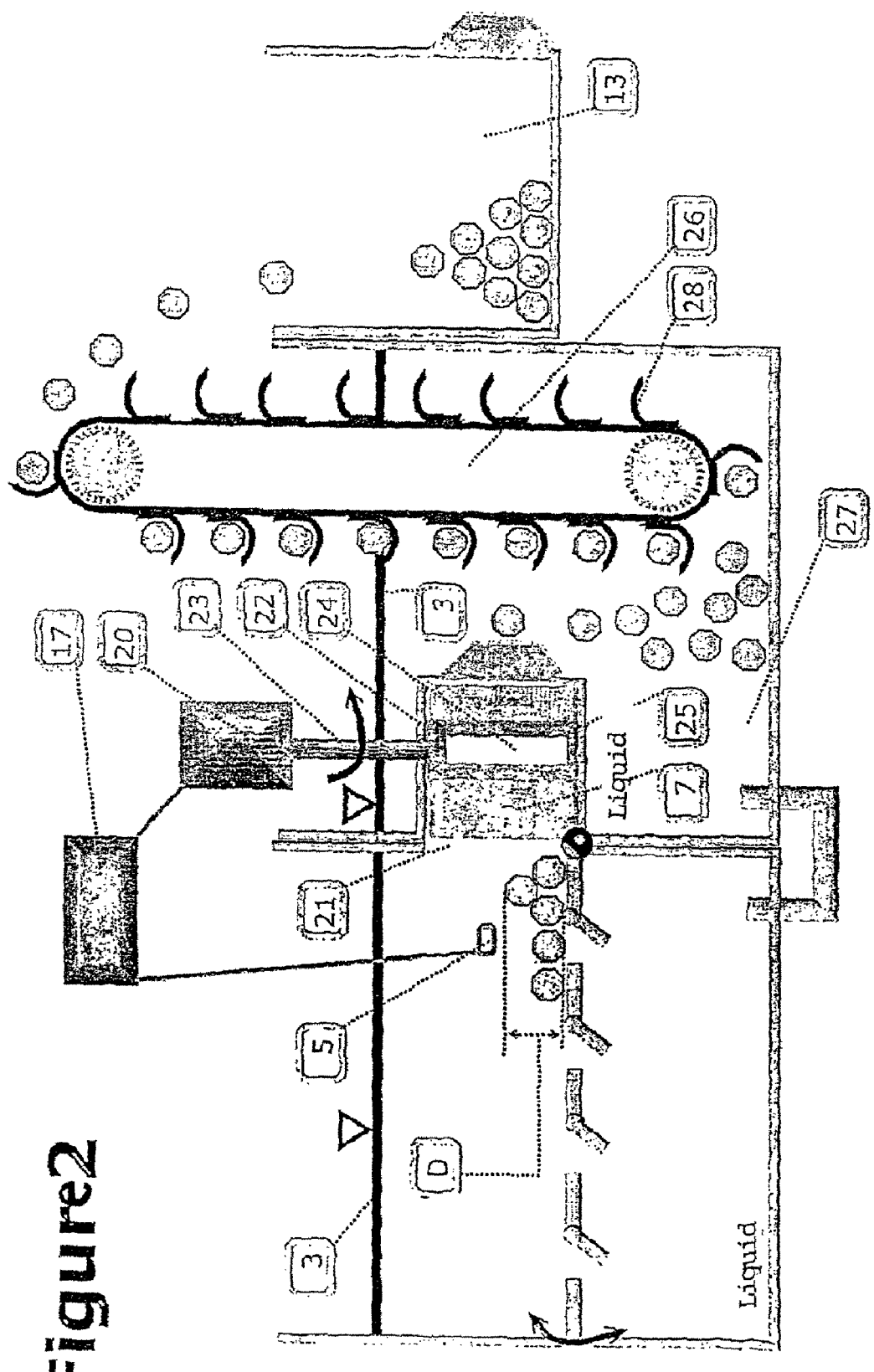
FIG. 2 is an exemplary discharging device of the device shown in FIG. 1.

FIG. 2 shows a possible way of how to design a discharging device. The discharging device (8) comprises a housing (22) in which a revolving cylinder (25) is concentrically mounted on one end in the covering of the housing and on the other end in a bottom plate. The cylinder (25) is equipped on its surface in longitudinal direction with at least one elastic lip (7), which brushes over an entry opening (21) from the flotation tank (2) and a following discharging opening (24) when the cylinder (25) is revolved.

By doing so material from the sediment layer (12) is scratched off and transported into a follow-up collection container (27), which is filled with the same liquid to the same level as the flotation tank (2). A belt or chain conveyer (26), being equipped with ladles or buckles, transport settled material to a checking containment (13). A single or a plurality of revolving cylinders (25), rotated by a drive (20) working on a drive shaft (23), may be arranged in a horizontal or vertical way. It is only important that the whole of the longitudinal wall of the flotation tank (2), toward which the grid-bottom may be tilted, is overlapped.

Figure 3:
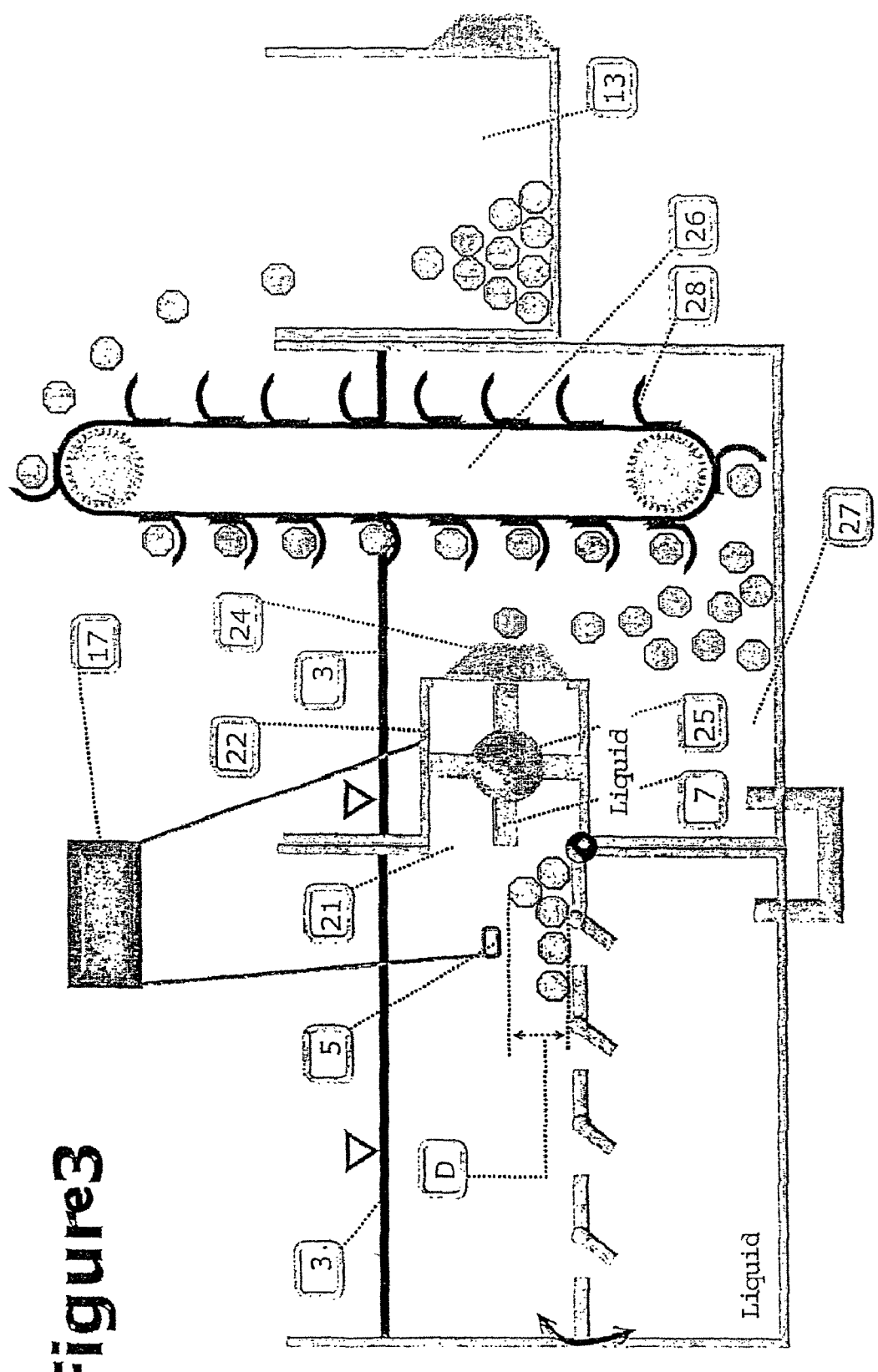
FIG. 3 is another exemplary discharging device of the device shown in FIG. 1.

FIG. 3 shows a discharging device (8) with a cylinder (25) being arranged in a horizontal way.

What is claimed is:

1. A method for separating plastic materials of different chemical composition by a flotation process, comprising the steps of:
    feeding shredded plastic materials into a flotation tank filled with water where the materials sink down slower or faster depending on their density;
    vibrating the water in the flotation tank to prevent lighter plastic particles from sinking down and to make the lighter plastic particles float upward to the surface of the water and into a container, and to cause heavier plastic particles to sink down and settle on a perforated plate bottom in the flotation tank forming a sediment which is extracted by a discharging device into a collection container;
    transporting the plastic particles collected in the collection container by a conveyer into a checking containment for a quality check;
    measuring the thickness of the sediment using at least one sensor; and
    regulating the thickness of the sediment layer on the perforated plate bottom using at least one control device that controls swiveling flaps underneath the perforated plate bottom and which receives commands from the at least one sensor.

2. The separation method according to claim 1, further comprising the step of compensating for losses of flotation liquid automatically or manually using a filling system designed such that recognizable water motion is prevented.

3. The separation method according to claim 1, further comprising the step of removing slowly sinking particles on a different level of the flotation tank above the perforated separation bottom for further separation into a second flotation tank.

4. A separation device for separating plastic materials of different chemical composition, comprising:
    a flotation tank filled with flotation liquid that is loaded, without creating whirls in the flotation liquid, by a filling tube with a conglomerate of plastic particles of various chemical composition pre-prepared in a shredder;
    a device for producing a pulsation, which includes a vibration distributor located in the flotation liquid underneath a perforated plate bottom that separates the flotation liquid;
    a continuously operating discharging device which scratches settled plastic particles and removes them into a collection container that contains liquid to the same level as the flotation tank;
    a conveyer to transport the settled plastic particles into a checking containment; and
    swiveling flaps on the lower side of the perforated plate bottom that control equalizing of the surface and the thickness of the sediment layer on the perforated plate bottom and which are controlled by a control device that receives its commands from a plurality of sensors.

5. The separation device according to claim 4, wherein the at least one control device also controls the inclination of the perforated plate bottom in order to equal out the surface and the thickness of the sediment layer on the perforated plate bottom.

6. The separation device according to claim 5, wherein the plurality of sensors are located in the flotation tank above the sediment layer and distributed over its surface in order to permit automatic variation of the position of the flaps and the inclination the perforated bottom.

7. The separation device according to claim 4, wherein the vibration distributor is shaped similar to a bell and is located above the bottom of the flotation tank surrounded by flotation liquid and which leaves a variable slot for vibration controlling.

8. The separation device according to claim 4, wherein the discharging device is attached to a housing of the flotation tank, and wherein the discharging device comprises at least one revolving cylinder that is mounted in a horizontal or vertical arranged cylindrical housing, and which has arranged on its perimeter at least one elastic lip that brushes over entry openings and a discharging opening of the cylindrical housing to scratch off settled plastic material from the sediment layer and remove it into a collection container.

9. The separation device according to claim 4, wherein the device for producing a pulsation making vibrating the flotation liquid is a hydraulic or pneumatic kind.

10. The separation device according to claim 9, wherein the intensity and frequency of the pulsating device is controllable.

* * * * *